United States Patent [19]

Vidovic

[11] 3,743,770

[45] July 3, 1973

[54] AUTOMATIC APERTURE CORRECTOR

[75] Inventor: Nikola V. Vidovic, Auburn, Calif.

[73] Assignee: The Singer Company, Binghamton, N.Y.

[22] Filed: Aug. 2, 1971

[21] Appl. No.: 168,015

[52] U.S. Cl. ............. 178/7.1, 178/DIG. 25, 330/17, 330/21, 330/29

[51] Int. Cl. ............................................ H04n 5/14

[58] Field of Search ................ 220/17, 29, 21, 30 R, 220/31; 178/7.1, DIG. 25; 325/46

[56] References Cited

UNITED STATES PATENTS 3,421,101 1/1969 Drew et al. ........................... 330/21

OTHER PUBLICATIONS

Bram et al. – "Video Circuits For Transistor Television Cameras" – Jour. SMPTE November, 1963, Vol. 72, pp. 853, 857–859.

*Primary Examiner*—Robert L. Griffin
*Assistant Examiner*—Joseph A. Orsino, Jr.
*Attorney*—Francis L. Masselle et al.

[57] ABSTRACT

An automatic aperture correction circuit for a television camera using two transistors with matched RC time constant networks to provide for high frequency gain with little or no phase shift and also including a varicap diode whose capacitance is controlled by the target voltage to automatically regulate the amount of correction as a function of light level.

5 Claims, 1 Drawing Figure

PATENTED JUL 3 1973 3,743,770
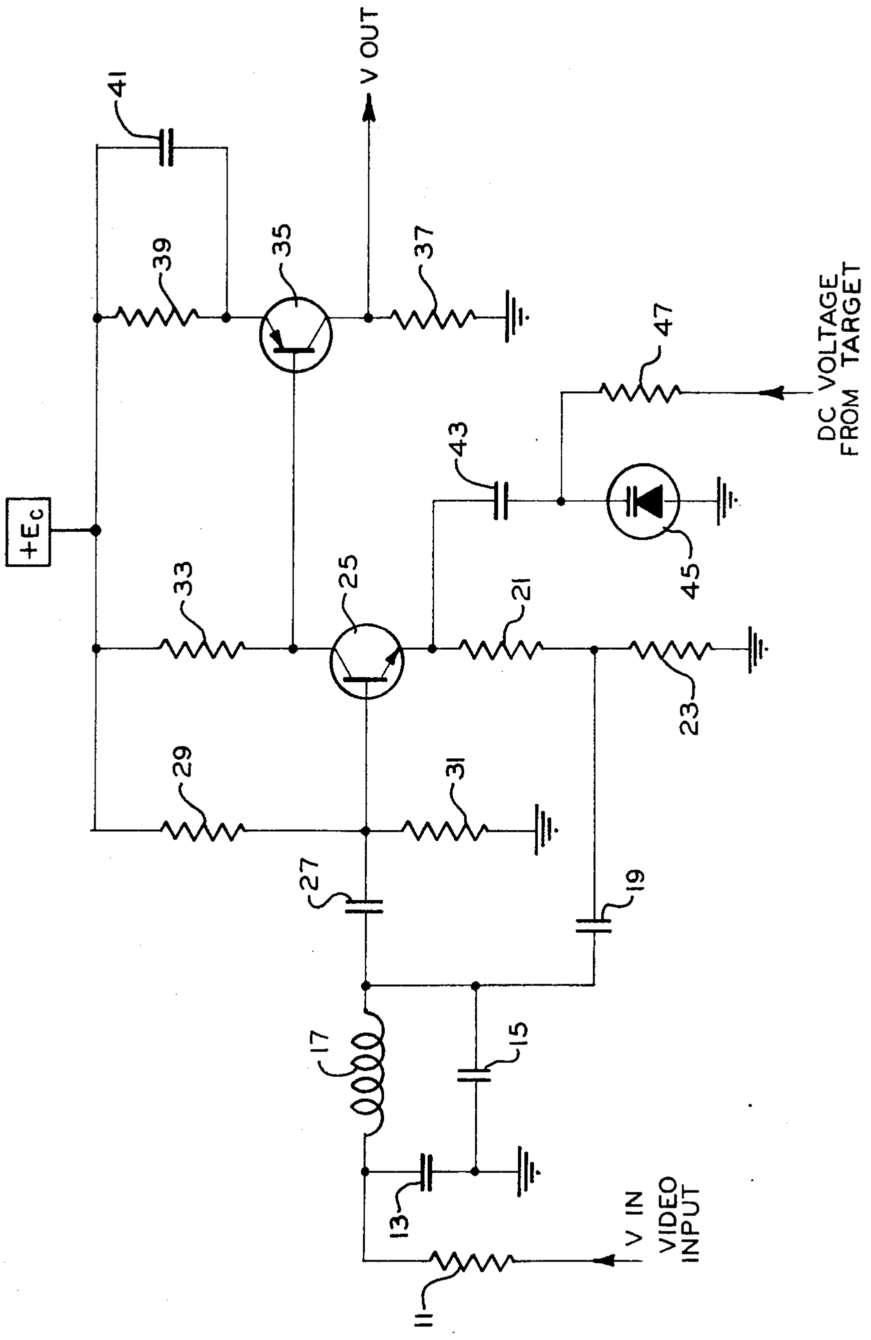

AUTOMATIC APERTURE CORRECTOR

This invention relates to television cameras and more particularly to an automatic aperture correction circuit for such a camera.

It is well known in the art that the resolution of the video signal obtained from a television camera may be improved by aperture correction. Aperture correction compensates for the blurring caused by the finite spot size of the scanning beam in the pickup tube. The type of circuit required is one which will amplify the high frequencies without introducing any phase shift. The frequency response should be in the form of the inverse Gaussian exp ($\omega^2T^2$). A reasonable approximation of this may be obtained by the first two terms of a power series expansion of this function, i.e., $1+\omega^2T^2$.

It is also known that aperture correction introduces noise into the video signal. Thus, if used in situations where the signal to noise ratio is low, e.g., low light level operation, it will have an undesirable effect. This makes it desirable to have a circuit which will automatically adjust the amount of correction as a function of light level.

The most common way to attain the required correction is through the use of delay lines. An alternative method using an operational amplifier is disclosed in U.S. Pat. No. 3,657,559. While both of these methods work well they do not have the feature of automatic correction as a function of light level which is a feature of the present invention. In addition, the circuit of the present invention uses only two transistors rather than the amplifier and traisistor of my previous invention, thus making it more economical.

The principal object of the present invention is to provide an aperture correction circuit for use in television cameras.

A further object to provide such a circuit which also provides for automatic adjustment of the amount of correction as a function of light level.

It is also an object to provide such a circuit which is more economical than prior art circuits with similar functions.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which the single FIGURE is a circuit diagram of a preferred embodiment of the present invention.

The video signal generated by the television camera is provided to an input resistor 11 (R1) and then passed through a low pass filter comprising capacitors 13 and 15 (C1) and inductor 17 (L1). The signal from the filter is provided through a coupling capacitor 19 (C3) to the junction of two resistors 21 (R4) and 23 (R6). The other end of resistor 21 is connected to the emitter of transistor 25. The other end of resistor 23 is connected to ground. High frequency components of the signal are provided through capacitor 27 (C2) to the base of transistor 25. The base is also connected to and biased by resistors 29 (R3) and 31 (R2). Resistor 29 has its other side connected to a positive voltage +Ec and resistor 31 has its other side connected to ground.

A load resistor 33 (R9) is connected between Ec and the collector of transistor 25. The collector output of transistor 25 is provided to the base of transistor 35 which has its collector connected to ground through resistor 37 (R7). The emitter of transistor 35 is connected through a resistor 39 (R5) and capacitor 41 (C5) in parallel to +Ec.

The emitter of transistor 25 is also connected to ground through a capacitor 43 (C4) and a varicap diode 45. At the junction of capacitor 43 and diode 45 a resistor 47 (R8) is connected which has its other end connected to the camera target voltage.

The response of the circuit may be computed using well known circuit analysis techniques to obtain a response:

$$V_{out}=V_{in}(R_7R_9/R_4R_5)(1+\omega^2C_2C_DR_4(R_3R_3/R_2+R_3))$$

For proper filter operation resistor 11 (R1) must be equal to resistor 21 (R4) in parallel to resistor 23 (R6). The only other contraint is that the time constant of $R_5$ $C_5$ must equal the time constant $C_2$ $R_2$ $R_3/R_2+R_3$. This will give about 6db of compensation to 5 MHz.

$C_D$ is the capacitance of the reverse biased varicap diode 45 and will change its capacitance as a function of the target voltage supplied through resistor 47. The automatic target control circuit in the camera will reduce the voltage for brightly illuminated scenes and increase it for dimly illuminated scenes. At the lower voltage $C_D$ will increase and thereby increase the aperture correction. For high voltages (low illumination) $C_D$ will decrease and decrease the correction. Capacitor 43 is a decoupling capacitor and should be about 100 times the value of $C_D$.

Thus, a simple aperture correction circuit using only two transistors has been shown. By the addition of a varicap diode the circuit automatically adjusts the amount of correction as a function of target voltage which in turn is directly related to light level, thereby avoiding noise problems at low light levels.

What is claimed is:

1. An aperture correction circuit for a video signal in television camera comprising:

a. a first transistor having the video signal provided as an input through a first capacitor to its base and through a second capacitor to a junction of first and second resistors connecting its emitter to ground, the output of said transistor being taken from its collector, said collector being connected through a third resistor to a voltage source;

b. fourth and fifth resistors connected in series between said voltage source and ground and having their junction connected to the base of said first transistor;

c. a third capacitor in parallel with said first and second resistors; and d. a second transistor having its base input connected to the output of said first transistor and having its emitter connected through a sixth resistor and fourth capacitor in parallel to said voltage source and its collector connected to ground through a seventh resistor, the output of said circuit being taken from said collectors; the time constant of said fourth capacitor times said sixth resistor being equal to the time constant of said first capacitor times the resistance of said fourth and fifth resistors in parallel.

2. The invention according to claim 1 wherein said voltage source is a positive voltage.

3. The invention according to claim 1 and further including a low pass filter interposed between said video input signal and said first and second capacitors.

4. The invention according to claim 3 wherein said filter comprises a pi network comprising an inductor having fifth and sixth capacitors connecting its ends to ground and an input resistor equal in value to said first and second resistors in parallel connected to one end of said inductor and having its output to said first and second capacitors taken from the other end.

5. The invention according to claim 1 wherein said third capacitor comprises a reverse biased varicap diode in series with a coupling capacitor, of a size two orders of magnitude larger, connected between said diode and the emitter of said first transistor, and the junction of said diode and capacitor is connected through an eigth resistor to the target voltage of the television camera.

* * * * *